United States Patent [19]

Chelminski

[11] Patent Number: 4,754,443
[45] Date of Patent: Jun. 28, 1988

[54] AIRGUN HAVING SHAFT-BEARING-GUIDED SHUTTLE AND CAPABLE OF FAST REPITITION SELF-FIRING

[75] Inventor: Stephen V. Chelminski, West Redding, Conn.

[73] Assignee: Bolt Technology Corporation, Norwalk, Conn.

[21] Appl. No.: 672,107

[22] Filed: Nov. 15, 1984

[51] Int. Cl.$^4$ .................. A47L 5/00; G01V 1/04; H04R 1/02
[52] U.S. Cl. .................. 367/144; 181/119; 181/120; 181/400; 15/406
[58] Field of Search ............ 181/115, 116, 117, 118, 181/119, 120, 400, 401, 402; 15/300 R, 316 R, 316 A, 317, 404, 405, 406, 407, 408; 367/144, 146, 153, 154

[56] References Cited

U.S. PATENT DOCUMENTS

| | | | |
|---|---|---|---|
| 2,650,615 | 9/1953 | Nesham | 15/404 X |
| 3,249,177 | 5/1966 | Chelminski | 181/0.5 |
| 3,379,273 | 4/1968 | Chelminski | 181/0.5 |
| 3,653,460 | 4/1972 | Chelminski | 181/0.5 H |
| 3,808,822 | 5/1974 | Chelminski | 61/63 |
| 3,997,021 | 12/1976 | Chelminski | 181/106 |
| 4,034,827 | 7/1977 | Leerskov, Jr. et al. | 181/111 |
| 4,037,660 | 7/1977 | Newsom et al. | 15/316 R X |
| 4,038,630 | 7/1977 | Chelminski | 340/7 R |
| 4,230,201 | 10/1980 | Bays | 181/115 |
| 4,234,052 | 11/1980 | Chelminski | 181/120 |
| 4,271,924 | 6/1981 | Chelminski | 181/120 |
| 4,472,794 | 9/1984 | Chelminski | 367/144 |
| 4,525,813 | 6/1985 | Burrage | 367/144 |

FOREIGN PATENT DOCUMENTS 1542261  3/1979  United Kingdom ............... 181/115

*Primary Examiner*—Donald P. Walsh
*Assistant Examiner*—Brian S. Steinberger
*Attorney, Agent, or Firm*—Parmelee, Bollinger & Bramblett

[57] ABSTRACT

An airgun impulsive energy source has an elongated shaft bearing surrounding the shaft of the reciprocatable shuttle for guiding the shuttle and preventing its operating or firing pistons from contacting their respective cylinder walls. The illustrative embodiment of this airgun is proportioned to be self-firing with a fast repitition rate. This airgun has an elongated cylindrical housing with discharge ports in a cylindrical wall positioned between the operating and firing chambers. The shuttle-guiding shaft bearing is positioned in the cylindrical housing between the ports and an operating chamber. This shaft-guiding bearing has a length which is more than 1.7 times the diameter of the shuttle shaft, while the operating and firing pistons have diameters which are slightly less than the diameter of their respective cylinder walls for eliminating contact of these pistons with their cylinder walls, thereby advantageously dramatically increasing the firing cycles which can occur before the need for replacing any worn parts. Moreover, only the shuttle shaft guiding bearing is replaced, instead of the cylinder walls. The housing includes internal through passages which convey high pressure gas longitudinally through the airgun so that it can be coupled to subsequent airguns connected in series with the first one. Thus, a single source of high pressure gas may be utilized and fed in series through a sequence of airguns forming a flexible "string" of airguns capable of being inserted into and used for cleaning pipes of heat exchangers, boilers, water heaters and other internal regions of closed vessels, which are normally very difficult or impossible to reach into for cleaning. The discharges of pressurized gas by the string of airguns in liquid, usually water, in such equipment is used to dislodge sediment and deposits from the internal surfaces of such confined regions so that the loosened foreign materials can then be flushed out by the flowing liquid.

22 Claims, 2 Drawing Sheets

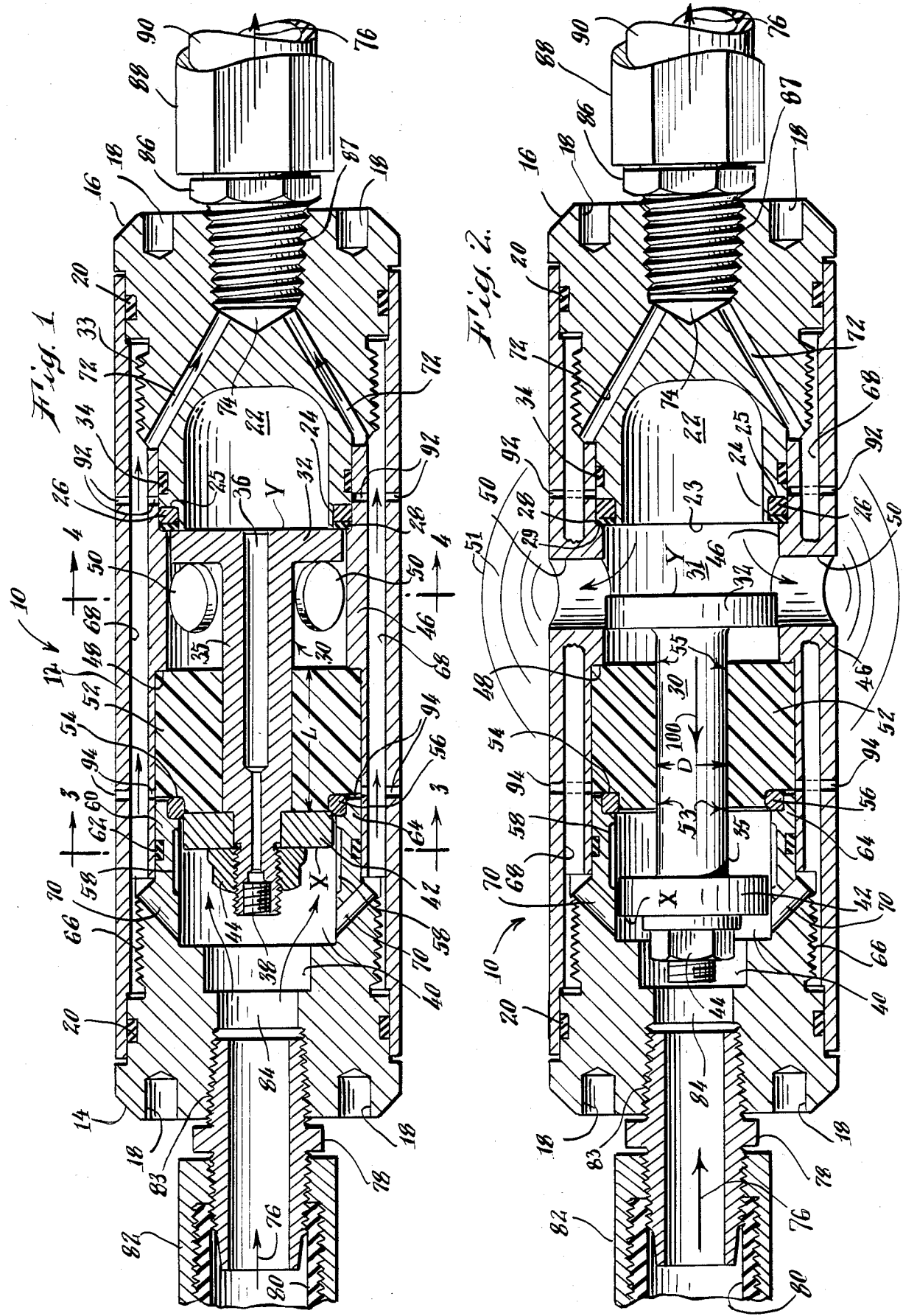

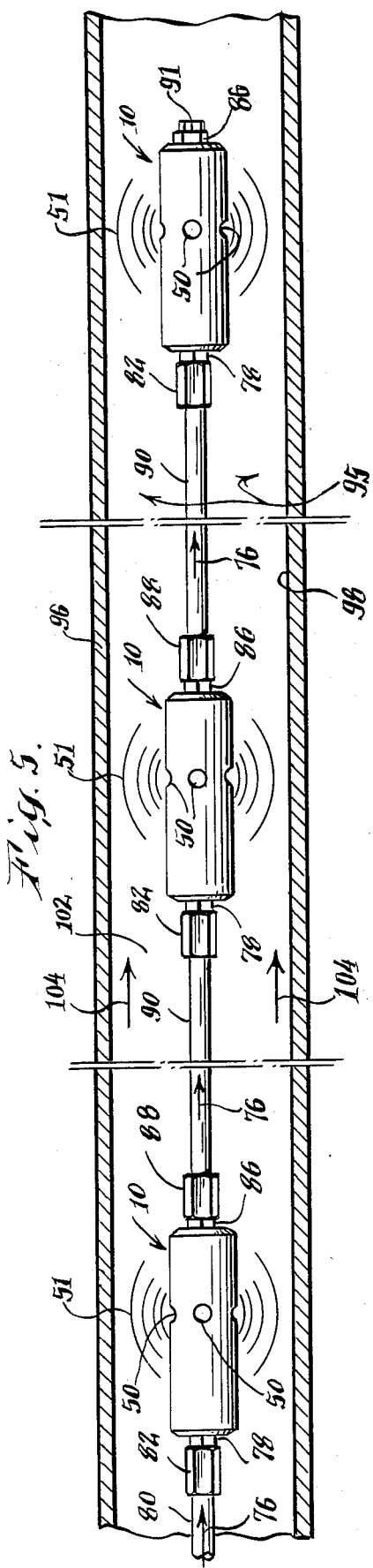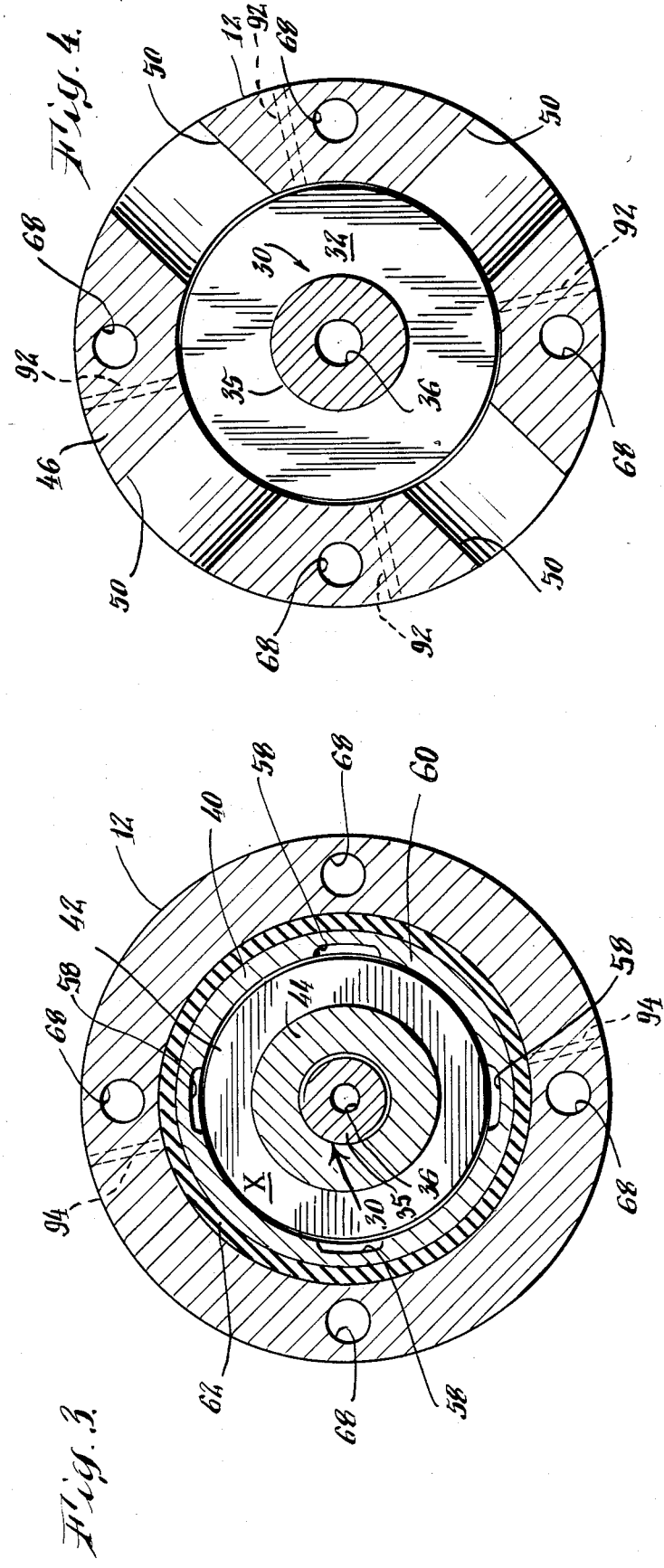

AIRGUN HAVING SHAFT-BEARING-GUIDED SHUTTLE AND CAPABLE OF FAST REPITITION SELF-FIRING

FIELD OF THE INVENTION

The present invention relates to an airgun impulsive energy source which has an elongated shaft seal bearing surrounding the shaft of the reciprocatable shuttle for guiding the shuttle and for preventing its operating or firing pistons from coming into contact with their respective cylinder walls. The illustrative embodiment of this airgun is proportioned to be self-firing with a fast repitition rate.

Airguns have found wide acceptance in the field of seismic surveying, originally for marine exploration and more recently for exploration on land. The present invention provides long-life airguns in which the cylinder walls are not subject to wear. The resulting long-life airguns ar advantageous for use in marine applications.

The present invention provides very durable airguns and opens up a new field of use for small size airguns which are capable of being inserted into and used for cleaning pipes of heat exchangers, boilers, water heaters and other internal regions of closed vessels, which are normally very difficult or impossible to reach into for cleaning. The discharges of pressurized gas by one, or by a string of airguns into liquid, usually water, in such vessels is used to dislodge sediment and deposits from the internal surfaces of such confined regions so that the loosened foreign materials can then be flushed out by the liquid flow surrounding the airgun(s).

BACKGROUND OF THE INVENTION

The airguns known prior to the present invention generally include as their operative components a firing chamber for holding a charge of gas under high pressure, release means which can be actuated to abruptly release this charge of pressurized gas through discharge ports, means for supplying gas under high pressure to charge the firing chamber, and control means for causing the release means to be actuated for suddenly discharging the pressurized gas from the firing chamber. The release means comprise a shuttle having a firing piston positioned near the firing chamber for retaining the charge of pressurized gas therein and an operating piston positioned in an operating cylinder wherein pressurized gas acts against this operating piston to maintain the shuttle in a closed position until it is released. The pistons of the shuttle are interconnected by a shaft or shank which is hollow for permitting a supply of pressurized gas to flow from the operating cylinder through the hollow shank into the firing chamber for charging the latter chamber.

In my U.S. Pat. No. 3,379,273 there is an explanation of the manner in which airguns may be made to be self-firing by appropriate relative sizing of the exposes surface areas of the firing and operating pistons, or they may be remotely controlled and fired by operation of a solenoid valve for initiating the flow of pressurized gas through various firing passages within the airgun to cause the shuttle to move suddenly within the airgun. Both self-firing and solenoid-valve-controlled firing modes of airgun operations are described in my U.S. Pat. No. 3,379,273. Additional background information may be obtained on airguns by reference to U.S. Pat. Nos. 3,808,822; 3,997,021; and 4,271,924.

SUMMARY

The illustrative embodiment of the invention is an airgun having an elongated cylindrical housing with discharge ports in a cylindrical wall positioned between the operating and firing chambers. The shuttle-guiding shaft bearing is positioned in the cylindrical housing between the ports and an operating chamber. Advantageously, this shaft bearing has a length which is more than 1.7 times the diameter of the shuttle shaft.

The operating and firing pistons are novel in that they have diameters which are slightly less than the diameter of their respective cylinder walls for eliminating contact of these pistons with their cylinder walls, thereby dramatically increasing the number of firing cycles which can occur before the need for replacing any worn parts. Moreover, only one component, namely, the shuttle shaft guiding bearing is replaced in addition to the operating and firing seals. Whereas, in prior airguns it was the sleeve liner of the wall of the operating cylinder and the sleeve liner of the discharge chamber cylinder having the discharge ports therein, namely, both sleeve liners which became worn and needed to be replaced in addition to the operating and firing seals.

The housing of this illustrative airgun includes internal through passages which convey the supply of high pressure gas longitudinally completely through the airgun so that it can be coupled to subsequent airguns connected in series with the first one. Thus, a single source of high pressure gas may be utilized and fed in series through a sequence of airguns forming a flexible "string" of airguns.

Accordingly, it is an object of this invention to provide a new and improved airgun which eliminates the requirement of replaceable sleeve liners in the operating and discharge port chambers of a cylindrical airgun in which a shuttle carrying dual pistons operates, thereby saving wear and tear in the airguns and eliminating the downtime associated with replacing such parts.

Advantageously, improved airguns are provided wherein the shank of the shuttle is guided by a shaft bearing encircling this shank in sliding relationship and having a length which is more than 1.7 times the diameter of the shank for accurately guiding the fast-moving shuttle with minimum wobble or wear during a long operating life. It will be seen that this shaft bearing guides the shuttle shank by sliding contact therewith at one end of the bearing and simultaneously guides the shuttle shank by sliding contact therewith at the other end of the bearing spaced axially more than 1.7 times the outside diameter (O.D.) of the shank away from the first end thus providing accurate smooth guidance for the shuttle during the sudden firing stroke and also during the sudden return stroke.

Another object of this invention is to provide a new and improved airgun which may be "strung" together in a linear array utilizing a common source of high pressure gas which is fed in sequence through a plurality of such airguns connected in series.

Still another object of this invention is to provide a new and improved airgun which is self-firing with a rapid repitition rate.

Still a further object of this invention is to provide new and improved small size airguns which can readily be strung together and interconnected by flexible hose sections forming a "string" for insertion into and usage for dislodging deposits and encrustations for cleaning liquid-filled pipes and other internal regions and inaccessible areas of equipment.

Still a further object of this invention is to provide new and improved airguns which are extremely small in size and which may be strung together and utilized for the control of marine life for discouraging marine creatures from entering into and becoming trapped within water intakes or entering other undesired regions, such as steam condenser intakes.

In carrying out this invention in one illustrative embodiment thereof an airgun energy source is provided wherein gas pressure in an operating chamber is applied to an operating piston of a reciprocatable shuttle having a shank extending from the operating piston with a firing piston on the other end of this shank. The pressure of pressurized gas in the operating chamber acts on the operating piston for holding the shuttle in an initial position in which the firing piston engages a firing seal to block access from a firing chamber to a discharge chamber having ports for preventing pressurized gas in the firing chamber from escaping until th airgun is fired and wherein the holding action of the gas pressure is overcome when the airgun is fired for permitting the sudden movement of the shuttle to an open position in which the firing chamber communicates with the discharge ports permitting the pressurized gas to burst forth through the ports for generating a powerful impulse and thereafter the shuttle quickly returns to its initial position. The airgun includes a elongated cylindrical housing having discharge ports in a discharge chamber positioned between the operating and firing chambers with a shaft bearing positioned in the discharge chamber near the discharge ports. This shaft bearing surrounds and guides the shank of the shuttle in its sudden movement in the housing. The shaft bearing has a length more than 1.7 times the diameter of the shank, and the operating and firing pistons have diameters which are slightly less than the inside diameters of the operating chamber and the firing chamber, respectively, traversed by these pistons thereby eliminating wear of the walls of these two chambers.

Among the many advantages of the elongated shaft bearing is the fact that it guides the shank of the piston along a substantial portion of that shank, and since the pistons are spaced from the walls of the chambers in which they move, wear on such chambers and on the pistons is elminated, thereby avoiding the requirements for replacing sleeves or liners in such chambers.

Rattle and vibrational-free fast-travel movement of the shuttle is also enhanced during both firing and return strokes, since there will be no uneven or bouncing contact of the peripheries of these pistons against the chamber walls in which they operate, since their peripheries are spaced a slight distance inwardly from the chamber walls.

The airgun also is provided with internal through passages isolated from and extending past the operating and firing chambers which enable a single source of high pressure gas to be fed to a firing chamber in the first airgun as well as passing through the cylindrical walls around the firing chamber for feeding the high pressure gas to a succeeding airgun of the same type in series, and so forth along a "string" of such airguns. In other words, a plurality of such airguns may be strung together in series utilizing a single source of high pressure gas for feeding the entire string from one end of the string.

BRIEF DESCRIPTION OF THE DRAWINGS

The invention, together with further aspects, objects, advantages and features thereof, will be more clearly understood from a consideration of the following description in conjunction with the accompanying drawings in which like elements bear the same reference numerals throughout the various views.

FIG. 1 is an axial sectional view of a rapid repitition rate self-firing high pressure cylindrical airgun embodying the present invention, illustrating the firing piston of the shuttle in its initial position in which the firing piston engages the firing seal for holding a charge of high pressure air or other gas or mixture of pressurized gases in the firing chamber ready for firing.

FIG. 2 is a view similar to FIG. 1 illustrating the firing of the airgun. The holding action of the gas pressure has been overcome causing the shuttle to move suddenly in a firing stroke allowing the firing chamber to communicate with the discharge ports permitting the pressurized gas to burst forth suddenly through the ports.

FIG. 3 is a cross-sectional view taken along the line 3—3 of FIG. 1.

FIG. 4 is a cross-sectional view taken along line 4—4 of FIG. 1.

FIG. 5 illustrates an array of the airguns embodying the present invention strung in series and inserted in a pipe or vessel which is to be cleaned thereby. In FIG. 5 each airgun is drawn in a much smaller size than the airgun in FIGS. 1-4.

DESCRIPTION OF THE PREFERRED EMBODIMENTS

Referring now to FIGS. 1-4, an airgun referred to by the reference number 10 has a generally elongated cylindrical housing 12 closed at one end thereof by a top cap or end plug 14 and closed at the other end thereof by a bottom cap or end plug 16. Both the top and bottom caps 14 and 16 have spanner wrench sockets 18 therein adapted to receive a wrench utilized in assembling and dissassembling the airgun 10. O-ring seals 20 are mounted in grooves in both the end caps 14 and 16, respectively, to provide a seal between the cylindrical housing 12 and these end caps.

The inner portion of the bottom cap 16 has a firing chamber 22 formed therein capable of holding a charge of pressurized gas for example compressed air, at relatively high pressure. The mouth 23 (FIG.2) of this firing chamber 22 is surrounded by an upstanding axially extending lip 24 on the interior end of the cap 16 for holding a firing seal assembly including a resilient O-ring 26 and a durable ring element 28 in an annular seat 25. The ring element 28 is positioned for engaging the lower surface near the periphery of a firing piston 32 of a movable shuttle 30 having a shank or shaft 35. The O-ring 26 is made of tough, durable, elastic, stiffly flexible material, for example, high strength polyurethane. The O-ring 26 serves as a spring member located behind the ring sealing element 28 which is made of tough, durable bearing sealing material for example berrylium bronze, Nylon polyamide, Delrin acetal resin or high strength durable solid polyurethane.

The volume of the firing chamber 22 may be reduced or enlarged by replacing this bottom cap with one having a larger or smaller cavity 22 therein, as desired for a particular application. As will be explained, when the airgun 10 is arranged to fire in the self-firing mode, the larger the firing chamber 22, the slower the firing repitition rate. It is to be noted that the end cap 16 which is threaded at 32 holds the firing seal assembly 26 and 28 firmly in place. The ring element 28 is captured by resting against an internal shoulder 29 (FIG. 2) in the housing 12. The cylindrical housing is further sealed by another O-ring seal 34 in a groove in the cap 16. This seal 34 along with the O-ring seal 20 prevent the escape of high pressure air from the bottom end of the airgun 10 between the elongated cylindrical housing 12 and the cap 16.

An operating chamber 40 defined in the lower portion of the top cap 14 contains an operating piston 42 of the shuttle 30 which is secured on the upper end of the shuttle shank 35 by a lock nut 44. The shuttle shank 35 has an axial passage 36 extending therethrough communicating with the operating chamber 40 through an orifice element 38 which screws into a threaded socket in the upper end of the passage 36. This orifice element 38 can be removed and replaced by another for changing the effective size of the orifice leading into the passage 36 for regulating the repitition rate of firing by setting the rate at which pressurized gas can flow through the axial passage 36 to recharge the firing chamber 22 after each firing of the airgun. In this embodiment of the airgun 10, the firing piston 32 is integrally formed on the end of the shank 35.

Above the firing chamber 22 and positioned in the somewhat thicker cylindrical port wall portion 46 of the elongated cylindrical housing 12 are a plurality of discharge ports 50 communicating directly out from a discharge port chamber 31 (FIG. 2). As shown in FIG. 1, the port chamber 31 and its ports 50 are blocked from the firing chamber 22 when the shuttle 30 is in its initial position with its firing piston 32 sealed on the ring element 28 of the firing seal assembly 26, 28. In other words, the mouth 23 (FIG. 2) of the firing chamber 22 is closed by the firing piston 32 in its initial prefiring position as shown in FIG. 1. Accordingly, pressurized gas cannot escape from the firing chamber 22 when the shuttle 30 is in this initial pre-firing charging position.

The port wall 46 has an annular shoulder 48 thereon against which is positioned a shaft bearing and guide 52 having a length L. This shaft bearing 52 serves as a guide for the shuttle shaft 35 and serves as a bearing for this shaft. Also, this bearing 52 serves as a sliding seal, as will be appreciated by studying FIG. 2 which shows that the bearing 52 forms a sliding seal with the shuttle shank 35 for isolating the lower portion of the operating chamber 40 from the discharge chamber 31. This shaft bearing 52 is made of suitable corrosion-resistant bearing material, for example, bronze, Delcrin acetal resin or Torlon poly(amide-imide). It is at this point to be noted that the outside diameter (O.D.) of the operating piston 42 and the O.D. of the firing piston 32 are slightly less than the inside diameter (I.D.) of the respective chamber walls of chamber 40 and 31 in which they move. Accordingly, there is no contact between the peripheries of the operating and firing pistons 42 and 32, respectively, with the walls of their chambers 40 and 31, thereby eliminating the requirement of replaceable sleeve liners in which such pistons move and by which these pistons are guided.

The one-piece shaft seal bearing 52 advantageously has a length L which is more than 1.7 times the diameter of the shank or shaft 35 of the shuttle 30. Thus, it provides sliding guidance at 53 near to its upper end and simultaneously provides sliding guidance at 55 near its lower end for achieving accurate guidance of the fast-moving shuttle during firing and return and avoids any wobbling motion of the shuttle during its fast firing and return strokes. This guidance bearing 52 for the shuttle shank 35 enables intentionally providing clearance between the peripheries of the pistons and the side walls of the operating chamber 40 and cylindrical port chamber 31 in which the operating and firing pistons move. In this embodiment the length L of the bearing 52 is 1.97 times the shaft diameter D, thus being substantially twice this diameter and this shaft diameter D itself is relatively large, for reasons as will be discussed below.

The upper end of the shaft seal and guidance bearing 52 has an annular seat 54 which accommodates an O-ring operating seal 56 which is in sealing engagement with the lower surface near the periphery of the operating piston 42 when the airgun shuttle 30 is in its initial pre-firing charging position as illustrated in FIG. 1. The shaft seal and guidance bearing 52 is made of suitable bearing material as described against which readily slides the stainless-steel shaft 35. The shuttle is made of very high strength corrosion-resistant material for example stainless steel, for example 17-4 PH (precipitation hardened) stainless steel. The diameter D (FIG. 2) of the shaft 35 is made relatively large as compared with the O.D. of the operating piston 42, because this relatively large shaft diameter D causes the shuttle 30 to return more rapidly pushed by the pressure of the pressurized gas in the operating chamber 40 to its initial sealed position after each firing. This rapid return and re-seating of the shuttle causes the repitition firing rate of the airgun to increase and also reduces the amount of pressurized gas which is discharged during each firing, thereby preventing the pressure in the firing chamber 22 from dropping all of the way down to ambient during each firing. Thus "D" is preferably at least 40% of the O.D. of the operating piston 42. In this embodiment D is 47% of the O.D. of the operating piston 42, namely being about one-half of said O.D.

The top cap 14 has a downwardly extending skirt 60 carrying an O-ring seal 62 and has a plurality of milled slots 58 in its inner surface surrounding the operating chamber 40 as illustrated most clearly in FIG. 3. These slots 58 serve as by-pass channels to equalize the pressure in the operating chamber above and below the piston 42 when the airgun is fired by allowing pressurized gas in the operating chamber to reach the underside of the operating piston 42 once it has been released from its sealing engagement with the operating seal 56 during the firing of the airgun.

The annular skirt 60 on the top cap 14 terminates in a lip 64 which retains and properly seats the operating seal 56 in its annular seat 54 on the shaft seal and guidance bearing 52. The top cap 14 is secured in the housing 12 by screwing into a threaded region 66.

The cylindrical housing 12 contains a plurality of axially extending through passages 68 in the form of four long holes drilled in the cylindrical side walls of the housing 12 as is shown in FIGS. 1–4. In FIG. 2 these axially extending drilled passages 68 are illustrated as being broken away in the vicinity of the discharge ports 50, because the four axially extending passages 68 are offset from these discharge ports 50 and extend along through the wall of the housing 12 between the respective four discharge ports, as clearly shown in FIG. 4. As will be seen in FIGS. 1 and 2, a plurality of downwardly diverging or outwardly slanted passages 70 are drilled in the top cap 14 which interconnect the operating chamber 40 in communication with the axially extending through passages 68. Likewise, the bottom cap 16 has a plurality of downwardly, converging or inwardly slanted passages 72 which interconnect the through passages 68 with an outlet chamber 74 in the bottom cap 16. A source of high pressure gas, for example compressed air, is supplied to the airgun 10 as indicated by the arrow 76 through a coupling member 78 which has a high pressure hose supply line 80 secured thereon by a fitting 82. The coupling member 76 is screwed into a socket 83 leading into an input chamber 84 which is in communication with the operating chamber 40 and with the slanted passages 70. On the other end of the airgun a coupling member 86 is screwed into a socket 87 leading from the outlet chamber 74. A length of high pressure hose 90 is attached to the coupling member 86 by a fitting 88. By utilizing this or other forms of coupling means and lengths of high pressure hose 90, a plurality of airguns can readily and conveniently be connected in series in a "string" for example, as is illustrated in FIG. 5.

The illustrated airgun 10 is arranged for self-actuated firing operation thus enabling control of the repitition rate of firing of the airgun to be accomplished by means of controlling the pressure in the supply line 80 as well as by proportioning of the effective piston areas and the size of the firing chamber 22 and the size of the orifice plug 38. The smaller this orifice, the slower will be the repitition rate of firing. In order to provide self-actuating firing operation, the effective area of the surface Y (facing downwardly toward the firing chamber 22) of piston 32 is made larger than the effective area of the surface X (facing upwardly) of the operating piston 42.

In this self-actuating firing arrangement, the operating piston 42 remains firmly seated against its operating seal 56 so long as the product of the pressure in operating chamber 40 times the area X exceeds the product of the pressure in the firing chamber 22 times the greater effective area of Y. As pressurized gas 76 is introduced into the operating chamber 40 from a high pressure source, for example from an air compressor, feeding through supply hose 80 into the input chamber 84 and hence into the operating chamber 40, pressurized gas passes through orifice element 38 and through the axial passage 36 in the shuttle shank 35 into firing chamber 22 for charging this latter chamber, which causes a rise of pressure in the firing chamber 22. Initially the pressure in the firing chamber 22 is below the pressure in the operating chamber 40. The shuttle 30 remains seated, until the pressure in firing chamber 22 acting against firing piston area Y overbalances the holding force being exerted by the pressure in the operating chamber on the area X of the operating piston 42, at which time the airgun fires itself by suddenly moving the operating piston 42 in a firing stroke 100 (FIG. 2) away from its seal 56. Immediately, the pressures above and below the operating piston 42, aided by the milled slots 56 in the annular skirt 60, approach equilibrium and the violent upward acceleration firing stroke 100 of the shuttle 30 occurs. The firing piston 32 is away from its seal assembly 26, 28, thereby abruptly opening the firing chamber mouth 23 into the port chamber 31 for allowing the high pressure gas which has been charged into the firing chamber 22 to burst forth through the discharge ports 50 into the ambient liquid, usually into water, thereby producing an abrupt, powerful impulse in the ambient liquid, as shown at 51 in FIG. 2. Immediately after the firing stroke the shuttle is returned in a fast moving return stroke to its initial position.

It is noted that the firing seal assembly 26, 28 is vented by vents 92 while the operating seal 56 is vented by vents 94 for preventing a build-up of pressure beneath these seals for preventing them from blowing out from their annular seats 25 and 54 during the firing operation. These vents 92 and 94 are offset from the through passages 64 and do not communicate with these through passages, as shown in FIGS. 3 and 4.

After the charge of pressurized gas has issued through the discharge ports 50, the pressure in the firing chamber 22 is reduced down dramatically toward ambient, but the pressure in the operating chamber 40 still remains high near the pressure of the gas supply 76 coming through the line 80. This high pressure in the operating chamber 40 acts upon a net effective area of the piston 42 (This net effective area is defined by the shank diameter "D".) to push the shuttle 30 quickly back in its return stroke to its closed, sealed position with the underside near the periphery of the operating piston 42 again being in sealing engagement with the operating seal 56 while the firing piston 32 is again in sealing engagement with the seal assembly 26, 28. The firing chamber again begins to fill through the orifice element 38 and through the axial passage 36 in the shuttle 30, while the supply 76 continues to replenish the operating chamber 40 so as to maintain essentially full supply pressure in the chamber 40 while the firing chamber 22 is being refilled.

In this automatic firing arrangement, when a constant supply of high pressure air 76 for example at 2,000 pounds per square inch (p.s.i.) is fed through the supply line hose 80, the airgun automatically recycles itself over and over again without receiving any control signals, except the constant pressure 76 being supplied through the line 80. Accordingly, powerful impulses are provided at frequent intervals for example firing every two seconds or less. In order to lengthen the intervals of firing (i.e. to decrease the repitition rate), when using such a source 76 of constant pressure, the restricted passage in orifice element 38 may be made smaller so that there is a larger lag in time before the pressure in the firing chamber 22 overbalances the holding force being exerted by the pressure in the operating chamber 40, or vice versa for shortening the intervals between firing, i.e., to increase the repitition rate. Also, as pointed out earlier the firing interval may be increased by increasing the size of the firing chamber 22, which also intensifies the impulse 51. Further, by raising the supply pressure 76, the firing interval is increased, and each impulse 51 becomes even stronger.

It will be understood, when a constant source 76 of high pressure gas is being supplied, at the same time as this high pressure gas feeds into the operating chamber 40 it is also feeding through these passages 68 to one or more airguns connected in series as is illustrated in FIG. 5. The last airgun 10 in the string has its outlet socket 87 plugged by a removable screw plug 91. Accordingly, by this convenient arrangement a single source of high pressure air may be utilized to operate a string or series of automatically self-firing airguns, which arrangement is most applicable in situations where multiple smaller airguns are desired, for example, inserting a string of such guns into enclosed vessels 96 containing liquid 102, such as water, for cleaning them. Such enclosed vessels 96 may be, for example, pipes or tubes or passageways in heat exchangers, condensers, boilers, water heaters and other internal regions 95 of closed vessels which are normally very difficult or impossible to reach into for cleaning. Such tubes or pipes are often subject to build-up of deposits, encrustations, precipitates, insoluble minerals, and the like on their interior surfaces. Powerful impulses 51 are thereby applied to the interior surfaces 98 of such confined regions 95 which tend to accumulate such undesirable deposits capable of being loosened by these impulses 51. The string of airguns linked together by suitable hose lengths 90, as illustrated in FIG. 5, can be inserted and moved within the restricted regions 95 for effectively loosening the deposits on the interior surfaces 98. Moreover, the frequent discharges of high pressure gas into the ambient liquid 102 tends to keep the liquid agitated for keeping the loosened particles in suspension so that they can be flushed out of the vessel 96 by maintaing a flushing flow 104 of this liquid. This liquid flow 104 may be used to propel the airgun string along through the vessel 96.

A string of airguns 10 such as shown in FIG. 5 may also be utilized when immersed in a body of water near a region from which to exclude marine life for protecting water inlets, condenser intakes and the like where there is a desire to keep marine life, such as turtles, and fish, from entering and becoming trapped.

Airguns embodying the present invention may be made in small, intermediate or large sizes. They are made of corrosion-resistant materials. Corrosion-resistant materials suitable for the shuttle 30 and for the shuttle guiding bearing 52 are described above. The housing 12 is made of strong corrosion-resistant material for example, stainless steel, and the end caps 14 and 16 are made of similar material. If desired for ease of manufacture, the end caps 14 and 16 may be made of easy matching aluminum bronze. The materials used are durable and high-strength, being corrosion-resistant for the types of applications contemplated.

Although the airgun embodying the present invention has been illustrated to be self-firing, it can be modified to be fired by utilizing a solenoid valve as will be understood from a review of my patents referenced in the introduction. The effective area X is then made slightly larger than Y, and firing passages are provided for enabling a triggering flow of pressurzied gas from a solenoid valve sudenly to reach the undersurface of the operating piston 42, namely, for such triggering flow suddenly to enter between the undersurface of this piston 42 and the end surface of the bearing 52 for suddenly impelling the shuttle away from the operating seal for firing the airgun. The advantages provided by the shaft seal bearing 52 which guides the shuttle shank 35 and thus eliminates the need for contact by chamber wall bearing surfaces with the circumferential peripheries of the operating and firing pistons 42 and 32 are also obtained in such solenoid-valve-fired airguns.

It is to be understood that the terms "upper" and "lower", and "top" and "bottom", are being used merely for convenience of description in reference to the drawings, with the left side of FIGS. 1 and 2 into which is supplied the pressurized gas 76 being considered as the top or upper end of the airgun 10. In actual usage, the airgun 10 may be operated in any desired orientation whatsoever with respect to the earth's gravitational field.

Also, it is to be understood that the term "pressurized gas" is intended to include compressed air or any other pressurized gas for example, such as nitrogen, carbon dioxide or steam or a mixture of pressurized gases, for example such as pressurized products of combustion which can be employed in an airgun. Usually the pressurized gas which is employed is compressed air for example, supplied from a multi-state high pressure air compressor at any desired pressure level, for example at an operating pressure level in the range from 500 pounds per square inch (p.s.i.) to 6,000 p.s.i. but lower or higher operating pressures may be used, depending upon the particular airguns used and their application.

By virtue of the fact that the inlet connection means 78,83 and the outlet connection means 86,87 are located in the center of each end, i.e., are concentrically located, a plurality of substantially identical airguns 10 can be strung together by short lengths 90 of high pressure hose forming a symmetrical string as shown in FIG. 5 with the intervening lengths of hose being aligned with the axis of each airgun for facilitating the travel of the string through the interior 95 of an elongated vessel 96. In other words, there is nothing lopsided nor unsymmetrical to become snagged in the interior 95 of the vessel. Moreover, by virtue of the fact that the only interconnections between the airguns 10 are the axially aligned lengths 90 of hose, there is provided considerable flexibility in the overall string of airguns for enabling and facilitating the travel of the airgun string through the closed vessel 96.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of operating an airgun including a reciprocatable shuttle having an elongated axially extending shank having an outside diameter with a firing piston having an outside diameter mounted on one end of the shank and an operating piston having an outside diameter mounted on the other end of the shank and wherein the operating piston is located in an operating chamber having an inside diameter and the firing piston is located in a discharge chamber having an inside diameter and having at least one discharge port means communicating between the discharge chamber and the exterior of the airgun and wherein the pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through the discharge port means and quickly thereafter the shuttle is returned to its initial position in a sudden return stroke comprising the steps of:

guiding the reciprocatable shuttle during its firing stroke and also during its return stroke solely by sliding contact with the shank of the shuttle at one, location, and simultaneously guiding the shuttle shank by sliding contact simultaneously occurring at another location spaced axially along the shank from said first location by a distance L which is at least 1.7 times outside diameter of said shank, spacing the periphery of the operating piston slightly inwardly away from the inner surface of the operating chamber wall, such that said outside diameter of said operating piston is slightly less than said inside diameter of said operating chamber, and spacing the periphery of the firing piston slightly inwardly away from the inner surface of the discharge chamber wall such that said outside diameter of said firing piston is slightly less than said inside diameter of said discharge chamber for restricting the movement of pressurized gas between the inner surfaces of the respective walls of said operating and discharge chambers and said outside diameters of said respective operating and firing pistons during said firing and return strokes and at the same time for preventing contact between either of the pistons and the respective inner surfaces of the walls of the respective chambers in which they suddenly move during said strokes.

2. The method of operating an airgun including a reciprocatable shuttle having an elongated axially extending shank having an outside diameter with a firing piston mounted on one end of the shank and an operating piston mounted on the other end of the shank and wherein the operating piston is located in an operating chamber and the firing piston is located in a discharge chamber having at least one discharge port means communicating between the discharge chamber and the exterior of the airgun and wherein the pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through the discharge port means and quickly thereafter the shuttle is returned to its initial position in a sudden return stroke comprising the steps of:

guiding the reciprocatable shuttle during its firing stroke and also during its return stroke solely by sliding contact with the shank of the shuttle at one point, and simultaneously guiding the shuttle shank by sliding contact simultaneously occurring at another point spaced axially along the shank from said first point by a distance L which is at least 1.7 times said outside diameter of said shank, spacing the periphery of the operating piston inwardly away from the inner surface of the operating chamber wall, spacing the periphery of the firing piston inwardly away from the inner surface of the discharge chamber wall for preventing contact between either of the pistons and the respective inner surfaces of the walls of the respective chambers in which they suddenly move during said strokes, and decreasing the length of time available for pressurized gas to escape from the firing chamber by increasing the suddenness of the return stroke by arranging for the diameter D of the shank of the shuttle to be more than 40% of the outside diameer of the periphery of the operating piston.

3. The method of operating an airgun including a reciprocatable shuttle having an elongated axially extending shank having an outside diameter with a firing piston having an outside diameter mounted on one end of the shank and an operating piston having an outside diameter mounted on the other end of the shank and wherein the operating piston is located in an operating chamber having a wall with an inside diameter and the firing piston is located in a discharge chamber having a wall with an inside diameter and having at least one discharge port means communicating between the discharge chamber and the exterior of the airgun and wherein the pressure of pressurized gas in the operating chamber exerts holding action on the operating piston for holding the shuttle in an initial closed postion for blocking acess from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through the discharge port means and quickly thereafter the shuttle is returned to its initial position in a sudden return stroke comprising the steps of:

guiding the reciprocatable shuttle during its firing stroke and also during its return stroke solely by sliding contact with the shank of the shuttle, spacing said outside diameter of said operating piston slightly inwardly away from said inside diameter of said operating chamber wall, spacing the said outside diameter of said firing piston slightly inwardly away from said inside diameter of said discharge chamber wall, thereby providing a small clearance between said operating piston and said operating chamber wall and between said firing piston and said discharge chamber wall for preventing contact between either of the pistons and the respective inner surfaces of the walls of the respective chambers in which they suddenly move during said strokes, said step of guiding the reciprocatable shuttle during its firing stroke and during its return stroke solely by sliding contact with the shank of the shuttle includes the step of:

guiding the shuttle shank by sliding contact at one point, and simultaneously guiding the shuttle shank by sliding contact simultaneously occuring at another point spaced axially along the shank from said first point by a distance L which is substantially twice said outside diameter of the shank.

4. The method of operating an airgun including a reciprocatable shuttle having an elongated axially extending shank having a diameter D with a firing piston mounted on one end of the shank and an operating piston having an outside diameter mounted on the other end of the shank and wherein the operating piston is located in an operating chamber and the firing piston is located in a discharge chamber having at least one discharge port means communicating between the discharge chamber and the exterior of the airgun and wherein the pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through said discharge charge port means and quickly thereafter the shuttle is returned to its initial position in a sudden return stroke comprising the steps of:

guiding the reciprocatable shuttle during its firing stroke and also during its return stroke solely by sliding contact with the shank of the shuttle, spacing the periphery of the operating piston inwardly away from the inner surface of the operating chamber wall, and spacing the periphery of the firing piston inwardly away from the inner surface of the discharge chamber wall for preventing contact between either of the pistons and the respective inner surfaces of the walls of the respective chambers in which they suddenly move during said strokes, decreasing the length of time available for pressurized gas to escape from the firing chamber by increasing the suddenness of the return stroke by arranging for the diameter D of the shank of the shuttle to be approximately one-half of the outside diameter of the periphery of the operating piston.

5. The method of operating an airgun as claimed in claim 4, including the step of:

arranging for the shank diameter D to be about 0.47 times said outside diameter of the periphery of the operating piston.

6. An airgun impulsive energy source wherein the pressure of pressurized gas in an operating chamber having an inside surface is applied to an operating piston of a reciprocatable shuttle having a shank extending from said operating piston to a firing piston for holding the shuttle in an initial position in which the firing piston of said shuttle engages a firing seal to block access from a firing chamber to at least one discharge port for preventing pressurized gas in said firing chamber from escaping until said airgun is fired and wherein the holding action of said gas pressure is released from said shuttle when said airgun is fired for permitting the sudden movement of said shuttle to an open position in which said firing chamber communicates with said discharge port permitting pressurized gas suddenly to escape from said firing chamber through said discharge port for generating an impulse, said airgun impulsive energy source being the improved airgun comprising:

an elongated cylindrical housing including a discharge chamber having an inside surface and having at least one discharge port opening to the exterior of the airgun from said discharge chamber, said discharge chamber communicating with said firing chamber when the shuttle is in open position and being blocked from said firing chamber when the shuttle is in closed position, shuttle guiding and sealing means positioned in said cylindrical housing between said discharge chamber and said operating chamber surrounding said shank in sliding guiding contact with the shank in its movement in said housing, and having a guiding length at least 1.7 times the diameter of said shank, and said operating and firing pistons having respective outside diameters which are slightly less than the inside diameters of the inside surfaces of the operating chamber and discharge chamber, respectively, traversed by said pistons thereby providing a small clearance between said respective pistons and said respective inside surfaces of said operating chamber and said discharge chamber for limiting the flow of pressurized gas between said outside diameters of said pistons and the inside surfaces of said operating chamber and discharge chamber during said sudden movement of said shuttle and at the same time eliminating sliding contact between said pistons and the inside surfaces of said chambers.

7. The airgun as claimed in claim 6, in which:

said shuttle guiding sealing means for guiding the shuttle solely by sliding contact with the shank of the shuttle engages the shuttle shank in sliding contact therewith in one region, and simultaneously engages the shuttle shank in sliding contact therewith in another region spaced along the shank from said first region by a distance L which is at least 1.7 times the outside diameter D of the shank.

8. The airgun as claimed in claim 7, in which:

said distance L is substantially twice D.

9. An airgun impulsive energy source wherein the pressure of pressurized gas in an operating chamber is applied to an operating piston of a reciprocable shuttle having a shank extending from said operating piston to a firing piston for holding the shuttle in an initial position in which the firing piston of said shuttle engages a firing seal to block access from a firing chamber to at least one discharge port for preventing pressurized gas in said firing chamber from escaping until said airgun is fired and wherein the holding action of said gas pressure is released from said shuttle when said airgun is fired for permitting the sudden movement of said shuttle to an open position in which said firing chamber communicates with said discharge port permitting pressurized gas suddenly to escape from said firing chamber through said discharge ports for generating an impulse, said airgun impulsive energy source being the improved airgun comprising:

an elongated cylindrical housing including a discharge chamber with at least one discharge port opening to the exterior of the airgun from said discharge chamber, said discharge chamber communicating with said firing chamber when the shuttle is in open position and being blocked from said firing chamber when the shuttle is in closed position, shuttle guiding and sealing menas positioned in said cylindrical housing between said discharge chamber and said operating chamber surrounding said shank in sliding guiding contact with the shank in its movement in said housing, and having a guiding length at least 1.7 times the diameter of said shank, said operating and firing pistons having respective outside diameters which are slightly less than the inside diameters of the operating chamber and discharge chamber, respectively, traversed by said pistons for eliminating sliding contact between said pistons and the inner surfaces of the walls of said chambers, and said shuttle guiding and sealing means is a unitary and generally cylindrical member of plastic having an axial bore therethrough in sliding contact with the shank of the shuttle.

10. The airgun as claimed in claim 9, in which:

said shuttle guiding and sealing means is a unitary member having an annular seat thereon located on the end facing the operating piston, an operating seal positioned in said annular seat, said airgun including a top member mountable in said housing and having a skirt extending downward therefrom, said skirt seating and holding said operating seal in said annular seat when said top member is mounted in the airgun.

11. An airgun impulsive energy source wherein the pressure of pressurized gas in an operating chamber is applied to an operating piston of a reciprocatable shuttle having a shank extending from said operating piston to a firing piston for holding the shuttle in an initial position in which the firing piston of said shuttle engages a firing seal to block access from a firing chamber to at least one discharge port for preventing pressurized gas in said firing chamber from escaping until said airgun is fired and wherein the holding action of said gas pressure is released from said shuttle when said airgun is fired for permitting the sudden movement of said shuttle to an open position in which said firing chamer communicates with said discharge port permitting pressurized gas suddenly to escape from said firing chamber through said discharge ports for generating an impulse, the improved airgun comprising:

an elongated cylindrical housing including a discharge chamber with at least one discharge port opening to the exterior of the airgun from said discharge chamber, said discharge chamber communicating with said firing chamber when the shuttle is in open position and being blocked from said firing chamber when the shuttle is in closed position, shuttle guiding and sealing means positioned in said cylindrical housing between said discharge chamber and said operating chamber surrounding said shank in sliding guiding contact with the shank in its movement in said housing, and having a guiding length at least 1.7 times the diameter of said shank, said operating and firing pistons having respective outside diameters which are slightly less than the inside diameters of the operating chamber and discharge chamber, respectively, traversed by said pistons for elminating sliding contact between said piston and the inner surfaces of the walls of said chambers, pressurized gas inlet connection means on the end of the airgun near said operating chamber and pressurized gas outlet connection means on the end of the airgun near said firing chamber, said cylindrical housing including a plurality of longitudinal passages extending in an axial direction and being offset in a circumferential direction from the discharge port, said longitudinal passages being in gas conducting communication with said inlet connection means and with said outlet connection means for enabling the airgun to be connected in spaced end-to-end relationship in a string with a plurality of similar airguns, and with a supply of pressurized gas being feedable into the pressurized gas inlet connection means on the end of the first airgun in the string and with the outlet connection means on the end of the last airgun in the string being plugged.

12. The airgun as claimed in claim 11, including:

a top end member and a bottom end member in said cylindrical housing, said gas inlet connection means being concentrically located in said top end member, said gas outlet connection means being concentrically located in said bottom end member, said top end member including a plurality of downwardly outwardly slanting passages communicating with said gas inlet connection means and with said longitudinal passages for feeding a supply of pressurized gas from said gas inlet connection means into said longitudinal passages, and said bottom end member including a plurality of downwardly inwardly slanting passages communicating with said longitudinal passages and with said gas outlet connection means for seeding pressurized gas from said longitudinal passages to said gas outlet connection means.

13. An airgun including a reciprocatable shuttle having an elongated axially extending shank with a firing piston mounted on one end of the shank and an operating piston mounted on the other end of the shank and wherein the operating piston is located in an operating chamber and the firing piston is located in a discharge chamber having at least one discharge port means communicating between the discharge chamber and the exterior of the airgun and wherein the pressure of the pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through said discharge port means and quickly thereafter the shuttle is returned to its initial position in a sudden stroke comprising:

guiding means for guiding the reciprocatable shuttle during its firing stroke and also during its return stroke solely by sliding contact with the shank of the shuttle, said guiding means having a length greater than the diameter of said shuttle shank and having two regions of sliding contact with the shank spaced axially along the shank by a distance greater than the diameter of the shank, the periphery of the operating pisotn being spaced inwardly away from the inner surface of the operating chamber wall, the periphery of the firing piston beign spaced inwardly away from the inner surface of the discharge chamber wall; and said guiding means for guiding the shuttle solely by sliding contact with the shank of the shuttle during the firing stroke and return stroke is a unitary and generally cylindrical member of plastic having an axial bore therethrough in sliding contact with the shank of the shuttle.

14. The airgun as claimed in claim 13, in which:

said guiding means for guiding the shuttle solely by sliding contact with the shank of the shuttle engages the shuttle shank in sliding contact therewith in one region, and simultaneously engages the shuttle shank in sliding contact therewith in another region spaced along the shank from said first region by a distance L which is at least 1.7 times the outside diameter D of the shank.

15. The airgun as claimed in claim 14, in which:
said distance L is substantially twice D.

16. A self-firing airgun adapted for use in liquid including an elongated cylindrical housing containing a reciprocatable shuttle having an elongated axially extending shank with a firing piston mounted on one end of the shank and an operating piston mounted on the other end of the shank and wherein the operating piston is located in an operating chamber within the housing and the firing piston is located in a discharge chamber within the housing having at least one discharge port means communicating between the discharge chamber and the exterior of the housing and wherein the pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through the discharge port means and quickly thereafter the shuttle is returned to its initial position in a sudden return stroke comprising:

guiding means for guiding the reciprocatable shuttle during its firing stroke and also during its return stroke solely by sliding contact with the shank of the shuttle, said guiding means having a first region in sliding contact with the shank of the shuttle and also having a second region in sliding contact with the shank, said first and second regions of sliding contact being spaced one from the other along the length of the shank by a distance which is at least 1.7 times the diameter of the shank, the operating piston having its periphery spaced inwardly away from the inner surface of the operating chamber, the firing piston having its periphery spaced inwardly away from the inner surface of the discharge chamber, the firing piston having a surface Y facing into the firing chamber when the shuttle in in said initial closed position and the operating piston having a surface X facing in the opposite direction from the surface Y, and said surface Y has a larger effective diameter than said surface X, said housing having gas inlet means on one end and having gas outlet means on the other end, said operating chamber communicating relatively freely with said gas inlet means for supplying pressurized gas into the operating chamber and said firing chamber communicating with said gas inlet means through a restriction for limiting the rate at which pressurized gas refills the firing chamber after each firing, and said housing having a plurality of passages extending longitudinally therein offset from the discharge port means and interconnecting said inlet and outlet means for enabling the self-firing airgun to be connected in a string with other similar self-firing airguns.

17. A self-firing airgun as claimed in claim 16, wherein:
said cylindrical housing has a relatively small outside diameter, and
said gas inlet means and said gas outlet means on opposite ends of the housing are concentrically located for enabling a plurality of said self-firing airguns to be connected in spaced end-to-end relationship by a length of high pressure hose between successive airguns in an essentially symmetrical string adapted for insertion into liquid within a vessel for repetitive self-firing of the airguns therein for dislodging deposits from the interior of the vessel.

18. A self-firing airgun as claimed in claim 16, in which:
said shank of the shuttle has a diameter which is more than 40% of the diameter of said surface X of the operating piston for causing the shuttle to return relatively quickly to its initial closed position folowing each firing of the airgun for preventing all of the pressurized gas in the firing chamber from blasting out from the firing chamber during firing of the airgun, thereby decreasing the time intervals between self-firing for increasing the self-firing repetitive rate.

19. A self-firing airgun as claimed in claim 18, in which:
said first and second regions of sliding contact with the shank of the shuttle are spaced one from the other along the length of the shank by a distance substantially twice the diameter of the shank.

20. A self-firing airgun as claimed in claim 18 wherein:
cylindrical housing has a relatively small outside diameter, and
said gas inlet means and said gas outlet means on opposite ends of the housing are concentrically located for enabling a plurality of self-firing airguns to be connected in spaced end-to-end relationship by a length of high pressure hose between successive airguns in a essentially symmetrical string adapted for insertion into liquid within a vessel for repetitive self-firing of the airguns therein for dislodging deposits from the interior of the vessel,
each self-firing airgun is capable of repetitive firing at repetition rates of at least once every two seconds for maintaining agitation in the liquid for aiding in the removal of the deposits in the interiors of vessels.

21. A self-firing airgun as claimed in claim 20, in which
the shank of the shuttle has a diameter about one-half of the diameter of the periphery of the operating piston for rapidly returning the shuttle to its initial closed position after each firing for providing said firing repetition rate.

22. A string of self-firing airguns adapted for insertion into liquid within a vessel for disloding deposits from the interior of the vessel comprising:
a plurality of substantially identical self-firing airguns each having an elongated cylindrical housing, the cylindrical housing of each airgun having pressurized gas inlet connection means on one end and pressurized gas oulet connection means on the other end, said pressurized gas inlet connection means and said pressurized gas outlet connection means being concentrically located on the respective ends of the housing, the cylindrical housing of each airgun having a plurality of passages extending longitudinally therein interconnecting said inlet and outlet connection means, said airguns being positioned in spaced end-to-end relationship, a high pressure hose line secured to the inlet connection means of the first airgun in the string for supplying pressurized gas to the inlet connection means of said first airgun, a plurality of relatively short lengths of high pressure hose line, each length extending between a successive pair of airguns in the string, each length having one end secured to the respective outlet connection means of the preceding airgun and having its other end secured to the respective inlet connection means of the following airgun, and the outlet connection means of the last airgun in the string being plugged, the cylindrical housing of each airgun includes a reciprocatable shuttle having an elongated axially extending shank with a firing piston mounted on one end of the shank and an operating piston mounted on the other end of the shank and wherein the operating piston is located in an operating chamber within the housing and the firing piston is located in a discharge chamber within the housing having at least one discharge port means communicating between the discharge chamber and the exterior of the housing and wherein the pressure of the pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the airgun is fired for permitting the sudden firing stroke of the shuttle to an open position in which the firing chamber communicates with the discharge chamber permitting pressurized gas suddenly to blast from the firing chamber through the discharge chamber and out through the discharge port means and quickly thereafter the shuttle is returned to its initial position in a sudden return stroke comprising:

guiding means for guiding the reciprocatable shuttle during its firing stroke and also during its return stroke solely by sliding contact with the shank of the shuttle, said guiding means having a first region in holding contact with the shank of the shuttle and also having a second region in sliding contact with the shank, said first and second regions of sliding contact being spaced one from the other along the length of the shank by a distance which is at least 1.7 times the diameter of the shank, the operating piston having its periphery spaced inwardly away from the inner surface of the operating chamber, the firing piston having its periphery spaced inwardly away from the inner surface of the discharge chamber.

* * * * *